US012636907B2

(12) United States Patent
Zhang

(10) Patent No.: US 12,636,907 B2
(45) Date of Patent: May 26, 2026

(54) ECCENTRIC JOUNCE TRAVELLING MECHANISM FOR CHILDREN'S TOY VEHICLE AND TRAVELLING METHOD

(71) Applicant: Chizhou HaiZhiBao Children Products Co., Ltd., Chizhou (CN)

(72) Inventor: Lin Zhang, Chizhou (CN)

(73) Assignee: Chizhou HaiZhiBao Children Products Co., Ltd., Chizhou (CN)

( * ) Notice: Subject to any disclaimer, the term of this patent is extended or adjusted under 35 U.S.C. 154(b) by 346 days.

(21) Appl. No.: 18/432,119

(22) Filed: Feb. 5, 2024

(65) Prior Publication Data

US 2024/0174022 A1     May 30, 2024

Related U.S. Application Data

(63) Continuation of application No. PCT/CN2023/141639, filed on Dec. 25, 2023.

(30) Foreign Application Priority Data

Nov. 7, 2022    (CN) .......................... 202211382035.7

(51) Int. Cl.
B60B 19/00          (2006.01)
B62K 9/00           (2006.01)
(52) U.S. Cl.
CPC ................ B60B 19/00 (2013.01); B62K 9/00 (2013.01)
(58) Field of Classification Search
CPC ................................... B62M 1/38; B62K 9/00
See application file for complete search history.

(56) References Cited

U.S. PATENT DOCUMENTS

| | | | | | |
|---|---|---|---|---|---|
| 605,182 | A | * | 6/1898 | Johnston | B62K 25/02 |
| | | | | | 280/229 |
| 7,240,969 | B2 | * | 7/2007 | Gu | B62K 25/02 |
| | | | | | 301/5.1 |
| 12,539,933 | B2 | * | 2/2026 | Kim | B62K 3/005 |
| 2005/0098973 | A1 | * | 5/2005 | Pace | B60B 27/02 |
| | | | | | 280/87.041 |

FOREIGN PATENT DOCUMENTS

| | | |
|---|---|---|
| CN | 2108047 A | 6/1992 |
| CN | 2493494 Y | 5/2002 |
| CN | 1613531 Y | 5/2005 |
| CN | 203864904 A | 10/2014 |
| CN | 116176747 A | 5/2023 |
| KR | 19990036571 A | 9/1999 |

* cited by examiner

*Primary Examiner* — Kevin Hurley

(57)          ABSTRACT

The present disclosure is an eccentric jounce travelling mechanism for a children's toy vehicle and a travelling method. The mechanism includes a vehicle frame, and a front wheel component and a rear wheel component arranged at a bottom of the vehicle frame for supporting the vehicle frame, and an eccentric adjustment mechanism is arranged at an interior of the front wheel component. By arranging the eccentric adjustment mechanism, the position of a positioning shaft can be controlled, and whether the front wheel component is eccentrically mounted or not can be controlled by the relative position between flat grooves on the positioning shaft and limit blocks, to cause the children's toy vehicle to smoothly travel and jounce upwards and downwards, increasing the interestingness of the children's toy vehicle.

9 Claims, 9 Drawing Sheets

ECCENTRIC JOUNCE TRAVELLING MECHANISM FOR CHILDREN'S TOY VEHICLE AND TRAVELLING METHOD

CROSS-REFERENCE TO RELATED APPLICATIONS

This application is a continuation of PCT/CN2023/141639, filed Dec. 25, 2023 and claims priority of Chinese Patent Application No. 202211382035.7, filed on Nov. 7, 2022, the entire contents of which are incorporated herein by reference.

TECHNICAL FIELD

The present disclosure relates to the technical field of children's vehicles, in particular to an eccentric jounce travelling mechanism for a children's toy vehicle and a travelling method.

BACKGROUND

Children's vehicles are one of the major categories of children's toys, including children's bicycles, children's strollers, babies' walkers, children's tricycles and children's electric vehicles. The children's bicycles are suitable for children in the age range of 4-8 years old. When a bicycle is to be bought, children's age and height are to be taken into consideration for selecting a bicycle with an appropriate size, i. e., a bicycle with a saddle height within a range of 435-635 mm, and the size of hand brake handle is to be paid attention to.

The existing children's toy vehicles usually have a front wheel and a rear wheel mounted on a vehicle frame through bearings, and the wheels can only keep a constant use state and run smoothly or sway back and forth in place like a swing vehicle, and cannot realize the conversion of the two states according to the requirements, reducing the interestingness of children's toy vehicles.

SUMMARY

The present disclosure provides an eccentric jounce travelling mechanism for a children's toy vehicle and a travelling method based on the technical problem that the existing children's toy vehicles cannot realize the conversion of two states according to requirements, reducing the interestingness of the children's toy vehicles.

The present disclosure provides an eccentric jounce travelling mechanism for a children's toy vehicle and a travelling method. The mechanism includes a vehicle frame, and further includes a front wheel component and a rear wheel component arranged at a bottom of the vehicle frame for supporting the vehicle frame. A seat shell with an animal-shaped structure is clamped with an exterior of the vehicle frame, pedals convenient for retracting feet of a child are fixedly mounted on two sides of a middle part of the seat shell via bolts, and an eccentric adjustment mechanism for controlling a moving track of a front end of the vehicle frame is arranged at an interior of the front wheel component.

The eccentric adjustment mechanism includes an eccentric box sleeved with the interior of the front wheel component, an inner wall of one side of the eccentric box is arranged with a movable piece for adjusting the mounting position between the vehicle frame and the front wheel component, and an inner wall of the other side of the eccentric box is arranged with a positioning shaft for limiting and locking the movable piece.

Preferably, the eccentric box is formed by splicing a rear mounting cover and a front mounting cover, the front wheel component is formed by slidably clamping a left cover of front wheel and a right cover of front wheel, and the rear mounting cover and the front mounting cover are fixedly connected via bolts after being spliced.

Through the above-mentioned technical solution, the front wheel component can be disassembled at a later stage to facilitate the maintenance and replacement of the eccentric adjustment mechanism, and since the front mounting cover and the rear mounting cover are connected via bolts, an inner structure of the eccentric box can also be replaced and maintained at the later stage.

Preferably, coaxial straight notches are disposed on surfaces of one side of the rear mounting cover and the front mounting cover, and two convex rings slidably connected to inner walls of the two straight notches are fixedly connected to surfaces of two ends of the movable piece.

Through the above-mentioned technical solution, the movable piece can be supported by the cooperation of the two convex rings and the straight notches, and the position of the movable piece can be adjusted by changing the relative position between the convex rings and the straight notches.

Preferably, the front end of the vehicle frame is sequentially sleeved with the convex rings and the movable piece via a pin shaft to mount the front wheel component, limit blocks are fixedly connected to a surface of one side of the movable piece, and two matching grooves movably inserted with an outer surface of the positioning shaft are disposed on a surface of one side of the limit block, an axis of one of the matching grooves and an axis of the front wheel component being on the same horizontal center line.

Through the above-mentioned technical solution, it is possible to control whether the front wheel component is mounted eccentrically through the position between positioning shaft and the two matching grooves of the limit blocks, thereby controlling the travelling state of the children's toy vehicle.

Preferably, a driving port for placing a spring is disposed on an inner wall of the front mounting cover, an outer surface of one end of the positioning shaft is movably inserted with an inner wall of the driving port, and a flat groove matching with the limit block is disposed on a surface of one side of a middle part of the positioning shaft.

Through the above-mentioned technical solution, when the flat groove of the positioning shaft is flush with the limit block, the position between the positioning shaft and the movable piece can be adjusted, and the blocking between positioning shaft and the movable piece is lost by the flat groove to facilitate the relative displacement between the movable piece and the positioning shaft.

Preferably, a button for pressing and controlling the positioning shaft to move along an axial direction towards the rear mounting cover is movably sleeved on an outer surface of the other end of the positioning shaft, and a pressing port movably sleeved on an outer surface of the button is disposed on a surface of one side of the front mounting cover.

Through the above-mentioned technical solution, the button can be guided by the pressing port, and the positioning shaft can be controlled to move by pressing the button, so that the flat groove of the positioning shaft interfaces with the limit block.

Preferably, top walls and bottom walls of interiors of the driving port and the pressing port are planar to prevent the positioning shaft from rotating circumferentially when the front wheel component moves, and a limit ring for preventing the button from falling out of the pressing port is fixedly connected to a peripheral side surface of one end of the button.

Through the above-mentioned technical solution, it is possible to prevent the positioning shaft from rotating due to the jounce generated when the front wheel component is operated by the shape features of the driving port and the pressing port, so that the eccentric adjustment mechanism can be normally used.

Preferably, a travelling method based on an eccentric jounce travelling mechanism for a children's toy vehicle includes the steps of: pressing, by a guardian, a button towards one side of a front wheel component when it is required to change a children's toy vehicle from a normal and steady travelling state to a travelling state of a vehicle head reciprocating upwards and downwards, a positioning shaft pressing a spring to cause the positioning shaft to slide in a matching groove of a limit block, and to cause a flat groove of the positioning shaft to be flush with the limit block; pressing a seat shell downwards to cause a movable piece to move downwards, the position of the positioning shaft being unchanged to cause the movable piece to move downwards; and clamping the positioning shaft into the matching groove eccentric to the front wheel component, and releasing the button, the spring generating a thrust force on the positioning shaft to cause the positioning shaft to drive the button to reset, and to cause the mismatch occurring between the flat groove of the positioning shaft and the limit block, thereby realizing the eccentric mounting of the front wheel component, and a vehicle head part of the children's toy vehicle jouncing upwards and downwards when the children's toy vehicle moves due to the eccentric mounting of the front wheel component, increasing the interestingness of the children's toy vehicle.

The present disclosure has the following beneficial effects.

By arranging the eccentric adjustment mechanism, the position of the positioning shaft can be controlled by the button, and whether the front wheel component is eccentrically mounted or not can be controlled by the relative position between flat grooves on the positioning shaft and limit blocks, to cause the children's toy vehicle to smoothly travel and jounce upwards and downwards, increasing the interestingness of the children's toy vehicle.

Figure 1:
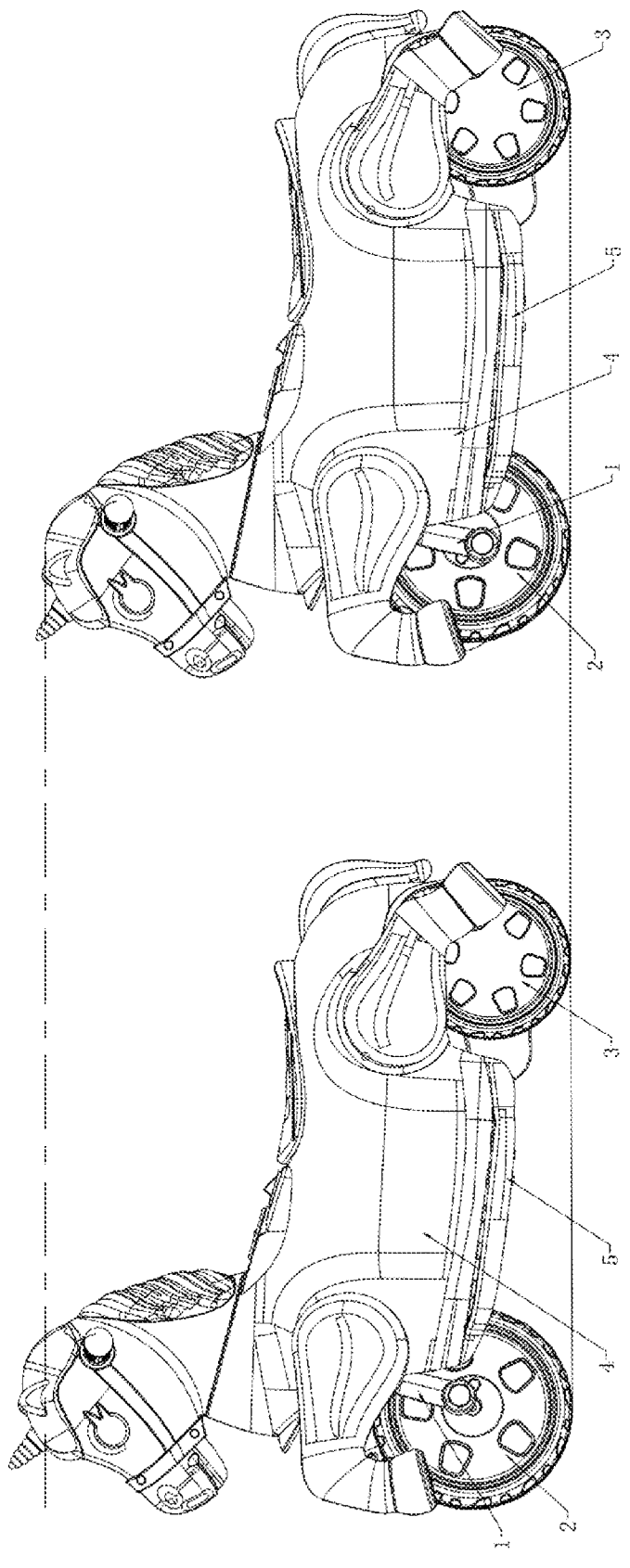
FIG. 1 is a schematic view of an eccentric jounce travelling mechanism for a children's toy vehicle and a travelling method according to the present disclosure.

Reference numerals and denotations thereof: 1—vehicle frame; 2—front wheel component; 3—rear wheel component; 4—seat shell; 5—pedal; 6—eccentric box; 61—movable piece; 62—positioning shaft; 63—rear mounting cover; 64—front mounting cover; 65—left cover of front wheel; 66—right cover of front wheel; 606—guide sliding groove; 67—straight notch; 68—convex ring; 69—limit block; 610—matching groove; 611—spring; 612—driving port; 613—flat groove; 614—button; 615—pressing port; 616—limit ring; and 617—socket.

DETAILED DESCRIPTION

Technical solutions in the examples of the present disclosure will be described clearly and completely in the following with reference to the attached drawings in the examples of the present disclosure. Obviously, all the described examples are only some, rather than all examples of the present disclosure.

Figure 2:
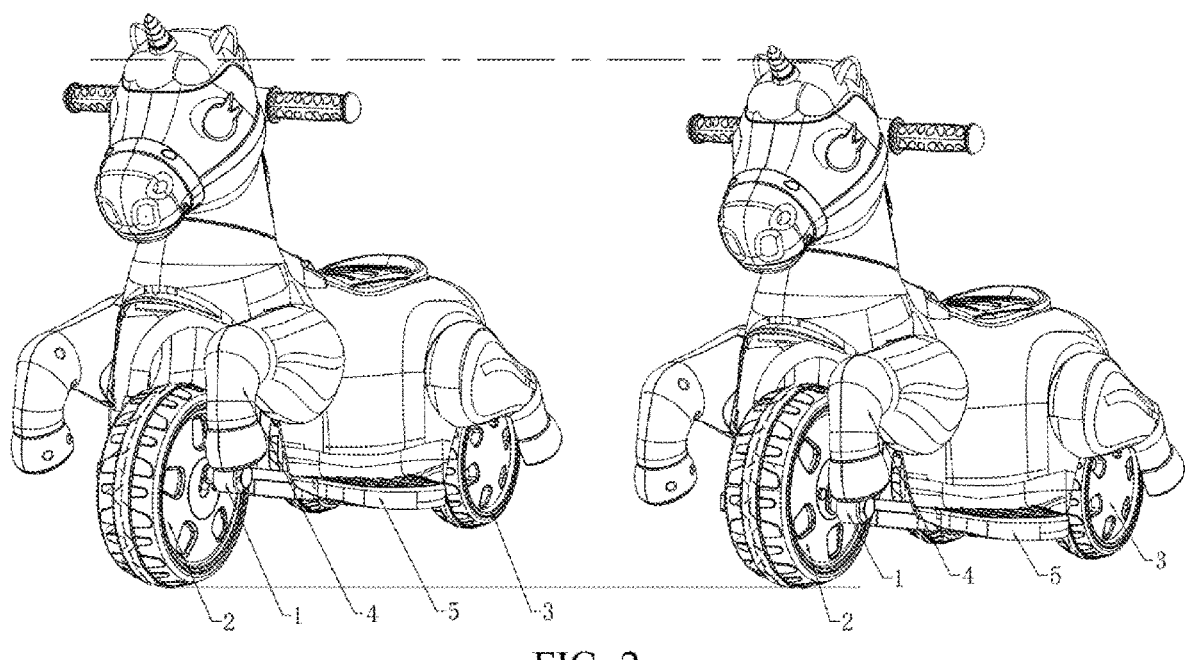
FIG. 2 is a comparison view of a fluctuating state of a seat shell structure of the eccentric jounce travelling mechanism for a children's toy vehicle and the travelling method according to the present disclosure.
Figure 3:
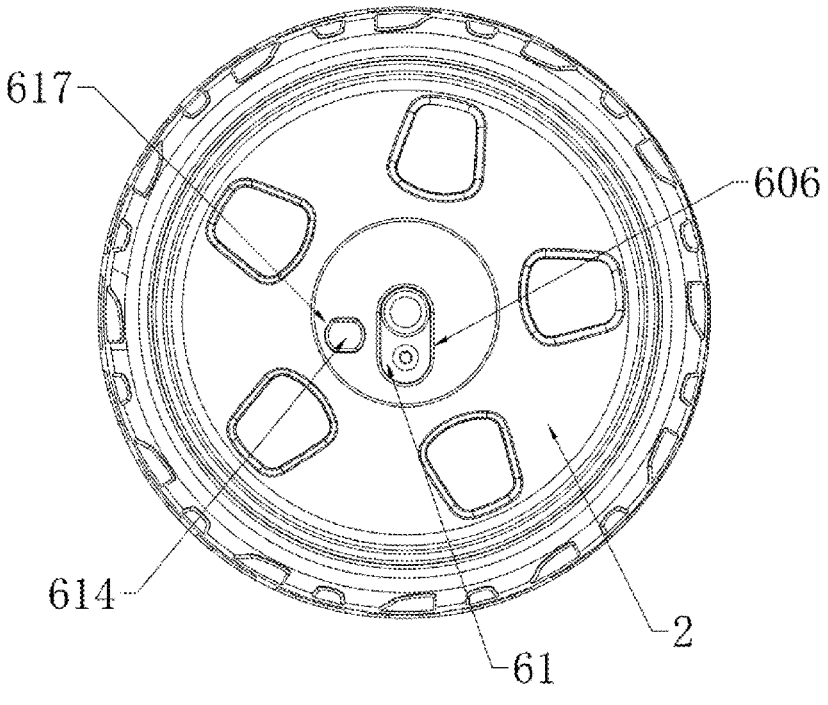
FIG. 3 is a side view of a front wheel component of the eccentric jounce travelling mechanism for a children's toy vehicle and the travelling method according to the present disclosure.
Figure 4:
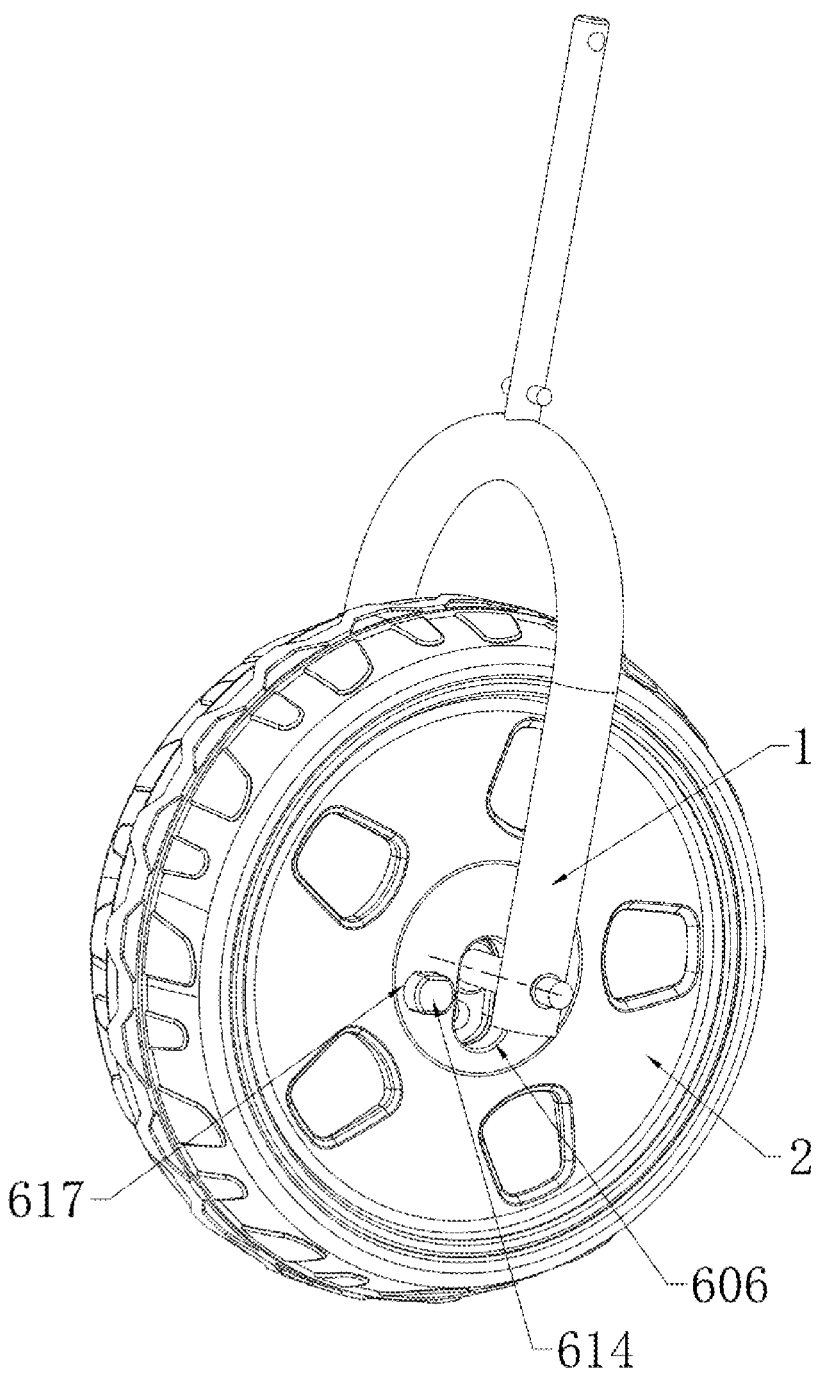
FIG. 4 is a coaxial mounting state view of the front wheel component and a vehicle frame structure of the eccentric jounce travelling mechanism for a children's toy vehicle and the travelling method according to the present disclosure.
Figure 5:
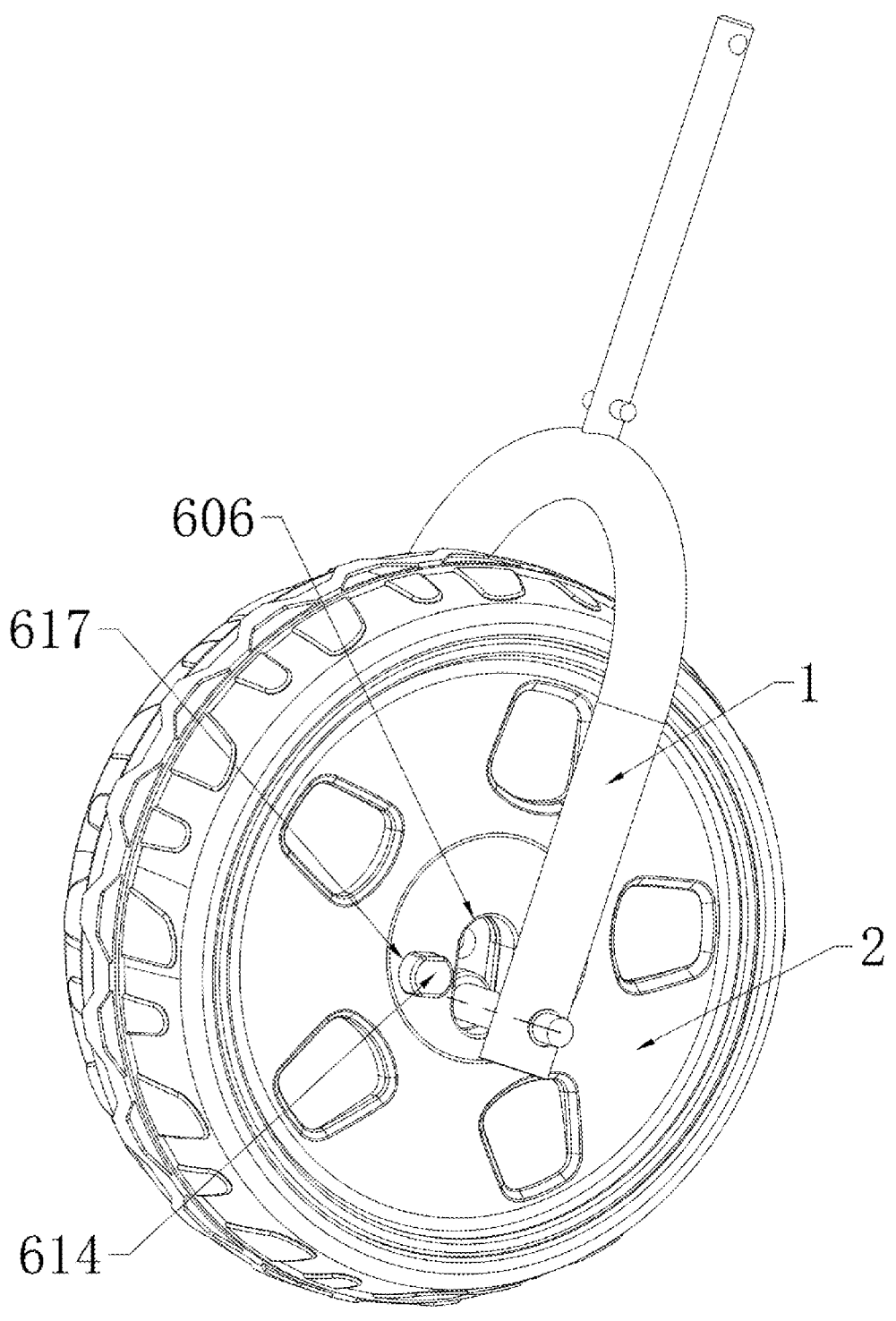
FIG. 5 is an eccentric mounting state view of the front wheel component and the vehicle frame structure of the eccentric jounce travelling mechanism for a children's toy vehicle and the travelling method according to the present disclosure.
Figure 6:
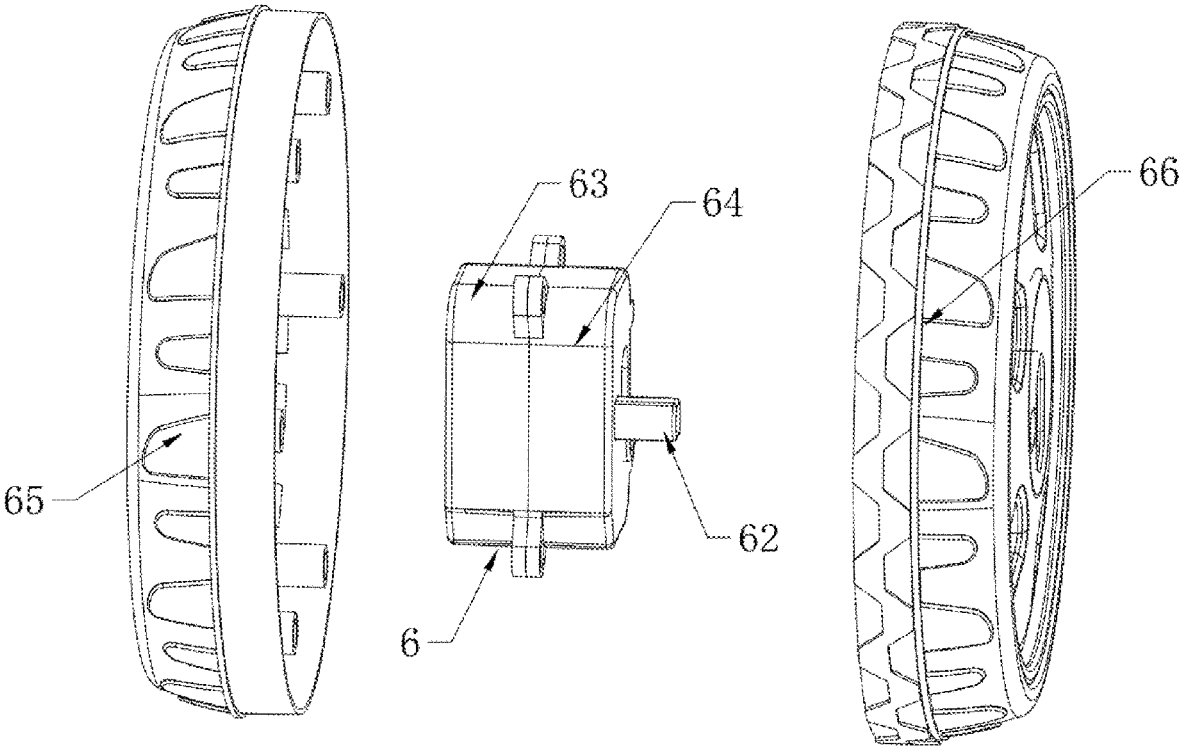
FIG. 6 is a structural perspective view of an eccentric box of the eccentric jounce travelling mechanism for a children's toy vehicle and the travelling method according to the present disclosure.
Figure 7:
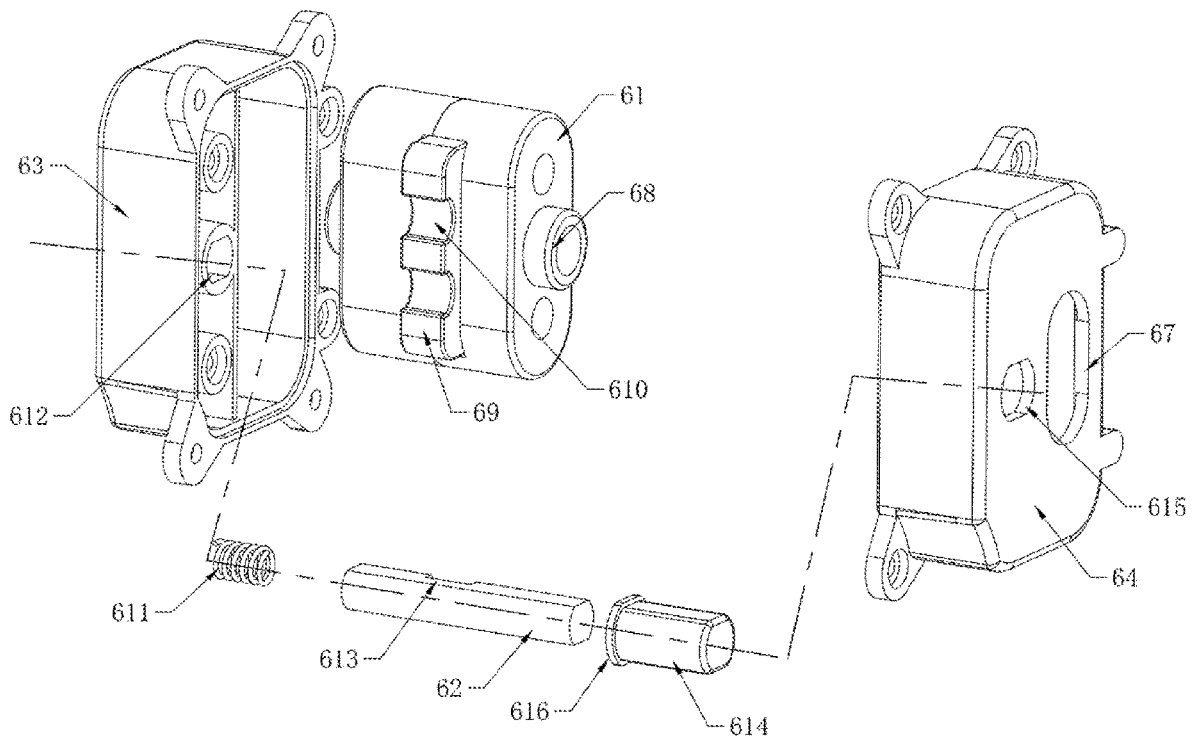
FIG. 7 is an exploded view of an eccentric adjustment mechanism of an eccentric box of the eccentric jounce travelling mechanism for a children's toy vehicle and the travelling method according to the present disclosure.
Figure 8:
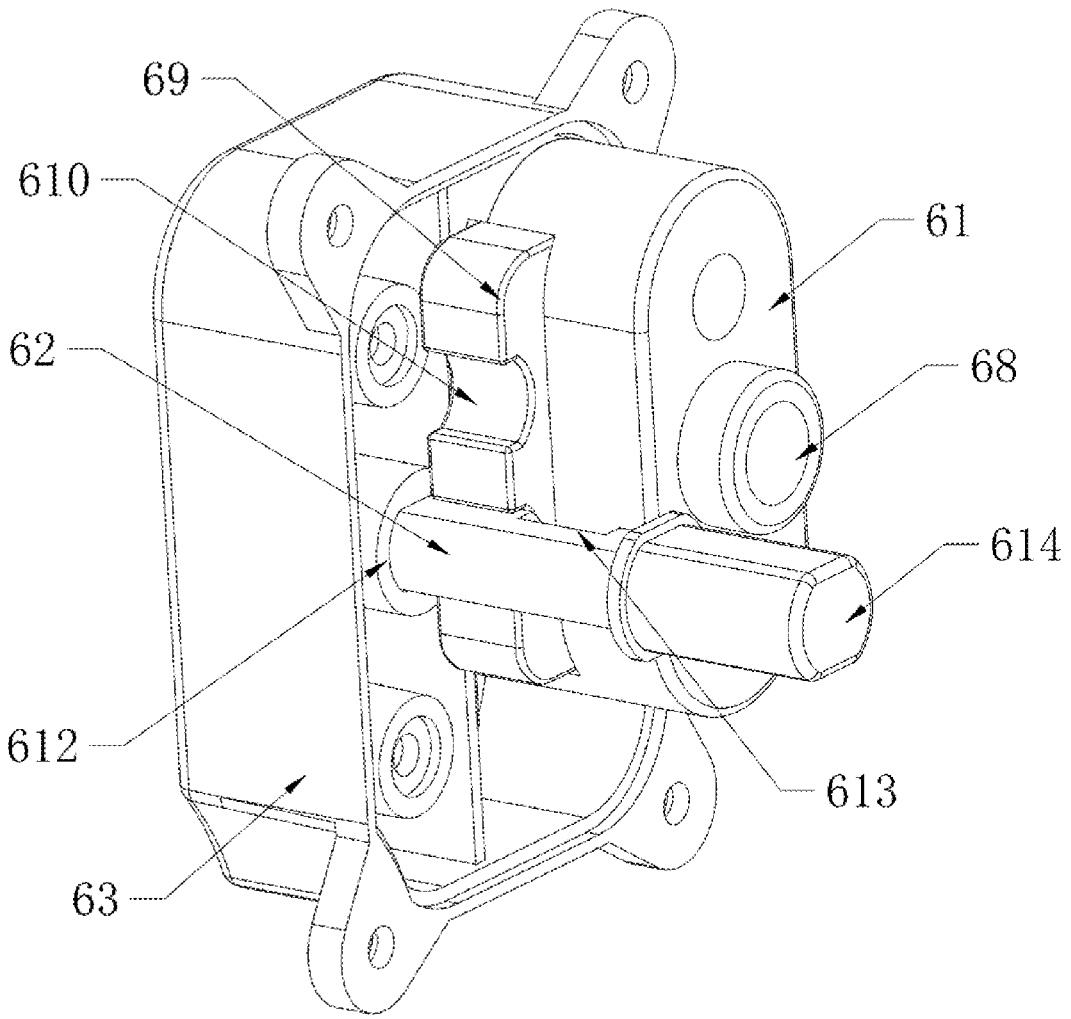
FIG. 8 is a perspective view showing a locking state of a positioning shaft structure and a movable piece structure before transformation of the eccentric jounce travelling mechanism for a children's toy vehicle and the travelling method according to the present disclosure.
Figure 9:
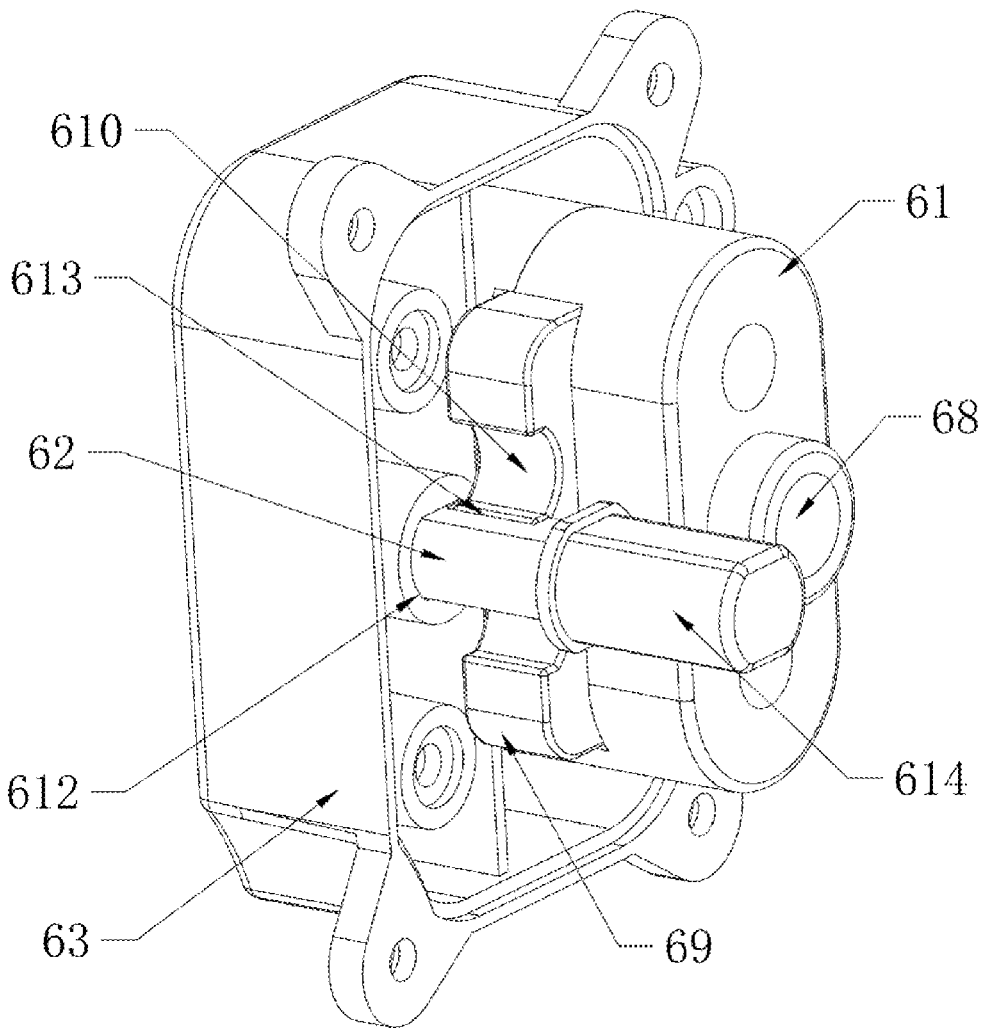
FIG. 9 is a perspective view showing the transformation of a locking state of a positioning shaft structure and a movable piece structure of the eccentric jounce travelling mechanism for a children's toy vehicle and the travelling method according to the present disclosure.
Figure 10:
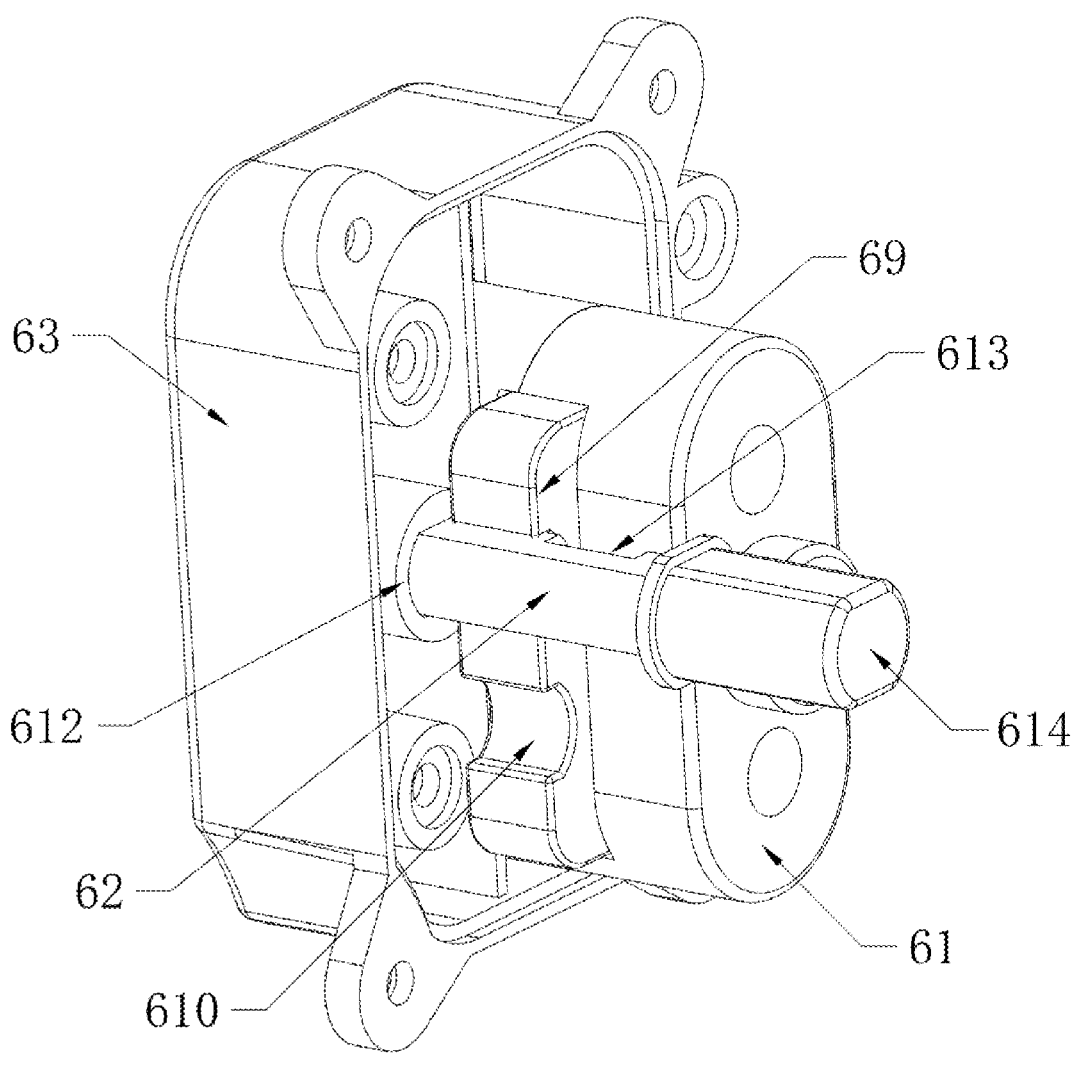
FIG. 10 is a perspective view showing a locking state of a positioning shaft structure and a movable piece structure after transformation of the eccentric jounce travelling mechanism for a children's toy vehicle and the travelling method according to the present disclosure.

Referring to FIGS. 1-10, an eccentric jounce travelling mechanism for a children's toy vehicle includes a vehicle frame 1, and further includes a front wheel component 2 and a rear wheel component 3 arranged at a bottom of the vehicle frame 1 for supporting the vehicle frame 1. A seat shell 4 with an animal-shaped structure is clamped with an exterior of the vehicle frame 1, pedals 5 convenient for retracting feet of a child are fixedly mounted on two sides of a middle part of the seat shell 4 via bolts, and an eccentric adjustment mechanism for controlling a moving track of a front end of the vehicle frame 1 is arranged at an interior of the front wheel component 2.

The eccentric adjustment mechanism includes an eccentric box 6 sleeved inside the front wheel component 2. In order to adjust the mounting position between the vehicle frame 1 and the front wheel component 2 and realize the eccentric mounting of the front wheel component 2, an inner wall of one side of the eccentric box 6 is arranged with a movable piece 61 for adjusting the mounting position between the vehicle frame 1 and the front wheel component 2. Further, in order to adjust the position of the movable piece 61, an inner wall of the other side of the eccentric box 6 is arranged with a positioning shaft 62 for limiting and locking the movable piece 61, and the eccentric box 6 is designed to be formed by splicing a rear mounting cover 63 and a front mounting cover 64 to facilitate the maintenance and replacement of the eccentric adjustment mechanism at a later stage. Further, the front wheel component 2 is designed to be formed by slidably clamping a left cover of front wheel 65 and a right cover of front wheel 66. Outer surfaces of the left cover of front wheel 65 and the right cover of front wheel 66 are both disposed with guide sliding grooves 606, and the rear mounting cover 63 and the front mounting cover 64 are spliced and fixedly connected via bolts, so that the front wheel component 2 can be disassembled at the later stage to facilitate the maintenance and replacement of the eccentric adjustment mechanism, and since the front mounting cover 64 and the rear mounting cover 63 are connected via the bolts, an inner structure of the eccentric box 6 is facilitated to being maintained and replaced at the later stage.

Further, in order to guide the movement track of the movable piece 61, coaxial straight notches 67 are disposed on surfaces of one side of the rear mounting cover 63 and the front mounting cover 64, and two convex rings 68 slidably connected to inner walls of the two straight notches 67 are fixedly connected to surfaces of two ends of the movable piece 61. The movable piece 61 can be supported by the cooperation of the two convex rings 68 and the straight notches 67, and the position of the movable piece 61 can be adjusted by changing the relative position between the convex rings 68 and the straight notches 67. Further, in order to better connect the vehicle frame 1 to the front wheel component 2, the front end of the vehicle frame 1 is sequentially sleeved with the convex rings 68 and the movable piece 61 via a pin shaft to mount the front wheel component 2, and in order to adjust the position of the movable piece 61, limit blocks 69 are fixedly connected to a surface of one side of the movable piece 61.

In order to adjust the concentric mounting and eccentric mounting of the front wheel component 2, two matching grooves 610 movably inserted with an outer surface of the positioning shaft 62 are disposed on a surface of one side of the limit block 69, an axis of one of the matching grooves 610 and an axis of the front wheel component 2 being on the same horizontal center line. When the positioning shaft 62 is matched with the matching grooves 610 coaxially arranged with the front wheel component 2, the children's toy vehicle is in a stable travelling state, and it is possible to control whether the front wheel component 2 is mounted eccentrically through the position between the positioning shaft 62 and the two matching grooves 610 of the limit blocks 69, thereby controlling the travelling state of the children's toy vehicle.

In order to push and reset the positioning shaft 62 through the spring 611 after the button 614 loses the pressing force, a driving port 612 for placing a spring 611 is disposed on an inner wall of the front mounting cover 64. In order to stably mount the positioning shaft 62 and control the positioning shaft 62 to move along the axial direction by means of pressing, an outer surface of one end of the positioning shaft 62 is movably inserted with an inner wall of the driving port 612. Further, in order to change the relative position between the movable piece 61 and the front wheel component 2 by adjusting the position of the positioning shaft 62 when it is required to adjust the position of the movable piece 61, a flat groove 613 matching with the limit block 69 is disposed on a surface of one side of a middle part of the positioning shaft 62. When the flat groove 613 of the positioning shaft 62 is flush with the limit block 69, the position between the positioning shaft 62 and the movable piece 61 can be adjusted, and the blocking between the positioning shaft 62 and the movable piece 61 is lost by the flat groove 613 to facilitate the relative displacement between the movable piece 61 and the positioning shaft 62.

Further, in order to control the positioning shaft 62, a button 614 for pressing and controlling the positioning shaft 62 to move along an axial direction towards the rear mounting cover 63 is movably sleeved on an outer surface of the other end of the positioning shaft 62. Further, in order to better control the positioning shaft 62, a pressing port 615 movably sleeved on an outer surface of the button 614 is disposed on a surface of one side of the front mounting cover 64. A socket 617 adapted to the pressing port 615 is disposed on a surface of one side of the right cover of front wheel 66, so that the button 614 can be guided by the pressing port 615. The button 614 is pressed to control the positioning shaft 62 to move to cause the flat groove 613 of the positioning shaft 62 to interface with the limit block 69.

In order to prevent the positioning shaft 62 from rotating circumferentially, top walls and bottom walls of interiors of the driving port 612 and the pressing port 615 are planar to prevent the positioning shaft 62 from rotating circumferentially when the front wheel component 2 moves. In order to prevent the button 614 from falling out of the pressing port 615, a limit ring 616 for preventing the button 614 from falling out of the pressing port 615 is fixedly connected to a peripheral side surface of one end of the button 614. The button 614 is prevented from sliding out of the pressing port 615 by the limit ring 616; and it is possible to prevent the positioning shaft 62 from rotating due to the jounce generated when the front wheel component 2 is operated by the shape features of the driving port 612 and the pressing port 615, so that the eccentric adjustment mechanism can be normally used.

By arranging the eccentric adjustment mechanism, the position of the positioning shaft 62 can be controlled by the button 614, and whether the front wheel component 2 is eccentrically mounted or not can be controlled by the relative position between flat grooves 613 on the positioning shaft 62 and limit blocks 69, to cause the children's toy vehicle to smoothly travel and jounce upwards and downwards, increasing the interestingness of the children's toy vehicle.

Working principles are as follows. A guardian presses the button 614 towards one side of the front wheel component 2 when it is required to change the children's toy vehicle from a normal and steady travelling state to a travelling state of a vehicle head reciprocating upwards and downwards. The positioning shaft 62 presses the spring 611 to cause the positioning shaft 62 to slide in the matching groove 610 of the limit block 69, and to cause the flat groove 613 of the positioning shaft 62 to be flush with the limit block 69. The seat shell 4 is pressed downwards to cause the movable piece 61 to move downwards, the position of the positioning shaft 62 is unchanged to cause the movable piece 61 to move downwards. The positioning shaft 62 is clamped into the matching groove 610 eccentric to the front wheel component 2, and the button 614 is released, the spring 611 generates a thrust force on the positioning shaft 62 to cause the positioning shaft 62 to drive the button 614 to reset, and to cause the mismatch occurring between the flat groove 613 of the positioning shaft 62 and the limit block 69, thereby realizing the eccentric mounting of the front wheel component 2. The vehicle head part of the children's toy vehicle jounces upwards and downwards when the children's toy vehicle moves due to the eccentric mounting of the front wheel component 2, increasing the interestingness of the children's toy vehicle.

The above is only the preferred example of the present disclosure, but the protection scope of the present disclosure is not limited to this. Within the technical scope disclosed by the present disclosure, any equivalent substitution or change made by a person familiar with the technical field according to the technical solution and the inventive concept of the present disclosure shall be covered by the protection scope of the present disclosure.

The invention claimed is:

1. An eccentric jounce travelling mechanism for a children's toy vehicle, comprising a vehicle frame (1), and further comprising a front wheel component (2) and a rear wheel component (3) arranged at a bottom of the vehicle frame (1) for supporting the vehicle frame (1), wherein a seat shell (4) with an animal-shaped structure is clamped with an exterior of the vehicle frame (1), pedals (5) convenient for retracting feet of a child are fixedly mounted on two sides of a middle part of the seat shell (4) via bolts, and an eccentric adjustment mechanism for controlling a moving track of a front end of the vehicle frame (1) is arranged at an interior of the front wheel component (2); and the eccentric adjustment mechanism comprises an eccentric box (6) sleeved with the interior of the front wheel component (2), an inner wall of one side of the eccentric box (6) is arranged with a movable piece (61) for adjusting the mounting position between the vehicle frame (1) and the front wheel component (2), and an inner wall of the other side of the eccentric box (6) is arranged with a positioning shaft (62) for limiting and locking the movable piece (61).

2. The eccentric jounce travelling mechanism for a children's toy vehicle according to claim 1, wherein the eccentric box (6) is formed by splicing a rear mounting cover (63) and a front mounting cover (64), the front wheel component (2) is formed by slidably clamping a left cover of front wheel (65) and a right cover of front wheel (66), and the rear mounting cover (63) and the front mounting cover (64) are fixedly connected via bolts after being spliced.

3. The eccentric jounce travelling mechanism for a children's toy vehicle according to claim 2, wherein coaxial straight notches (67) are disposed on surfaces of one side of the rear mounting cover (63) and the front mounting cover (64), and two convex rings (68) slidably connected to inner walls of the two straight notches (67) are fixedly connected to surfaces of two ends of the movable piece (61).

4. The eccentric jounce travelling mechanism for a children's toy vehicle according to claim 3, wherein the front end of the vehicle frame (1) is sequentially sleeved with the convex rings (68) and the movable piece (61) via a pin shaft to mount the front wheel component (2), limit blocks (69) are fixedly connected to a surface of one side of the movable piece (61), and two matching grooves (610) movably inserted with an outer surface of the positioning shaft (62) are disposed on a surface of one side of the limit block (69), an axis of one of the matching grooves (610) and an axis of the front wheel component (2) being on the same horizontal center line.

5. The eccentric jounce travelling mechanism for a children's toy vehicle according to claim 2, wherein a driving port (612) for placing a spring (611) is disposed on an inner wall of the front mounting cover (64), an outer surface of one end of the positioning shaft (62) is movably inserted with an inner wall of the driving port (612), and a flat groove (613) matching with the limit block (69) is disposed on a surface of one side of a middle part of the positioning shaft (62).

6. The eccentric jounce travelling mechanism for a children's toy vehicle according to claim 5, wherein a button (614) for pressing and controlling the positioning shaft (62) to move along an axial direction towards the rear mounting cover (63) is movably sleeved on an outer surface of the other end of the positioning shaft (62), and a pressing port (615) movably sleeved on an outer surface of the button (614) is disposed on a surface of one side of the front mounting cover (64).

7. The eccentric jounce travelling mechanism for a children's toy vehicle according to claim 6, wherein top walls and bottom walls of interiors of the driving port (612) and the pressing port (615) are planar to prevent the positioning shaft (62) from rotating circumferentially when the front wheel component (2) moves, and a limit ring (616) for preventing the button (614) from falling out of the pressing port (615) is fixedly connected to a peripheral side surface of one end of the button (614).

8. A travelling method based on an eccentric jounce travelling mechanism for a children's toy vehicle according to claim 1, comprising the steps of: pressing, by a guardian, a button (614) towards one side of a front wheel component (2) when it is required to change a children's toy vehicle from a normal and steady travelling state to a travelling state of a vehicle head reciprocating upwards and downwards, a positioning shaft (62) pressing a spring (611) to cause the positioning shaft (62) to slide in a matching groove (610) of a limit block (69), and to cause a flat groove (613) of the positioning shaft (62) to be flush with the limit block (69); pressing a seat shell (4) downwards to cause a movable piece (61) to move downwards, the position of the positioning shaft (62) being unchanged to cause the movable piece (61) to move downwards; and clamping the positioning shaft (62) into the matching groove (610) eccentric to the front wheel component (2), and releasing the button (614), the spring (611) generating a thrust force on the positioning shaft (62) to cause the positioning shaft (62) to drive the button (614) to reset, and to cause the mismatch occurring between the flat groove (613) of the positioning shaft (62) and the limit block (69), thereby realizing the eccentric mounting of the front wheel component (2), and a vehicle head part of the children's toy vehicle jouncing upwards and downwards when the children's toy vehicle moves due to the eccentric mounting of the front wheel component (2), increasing the interestingness of the children's toy vehicle.

9. A travelling method based on an eccentric jounce travelling mechanism for a children's toy vehicle according to claim 2, comprising the steps of: pressing, by a guardian, a button (614) towards one side of a front wheel component (2) when it is required to change a children's toy vehicle from a normal and steady travelling state to a travelling state of a vehicle head reciprocating upwards and downwards, a positioning shaft (62) pressing a spring (611) to cause the positioning shaft (62) to slide in a matching groove (610) of a limit block (69), and to cause a flat groove (613) of the positioning shaft (62) to be flush with the limit block (69); pressing a seat shell (4) downwards to cause a movable piece (61) to move downwards, the position of the positioning shaft (62) being unchanged to cause the movable piece (61) to move downwards; and clamping the positioning shaft (62) into the matching groove (610) eccentric to the front wheel component (2), and releasing the button (614), the spring (611) generating a thrust force on the positioning shaft (62)

to cause the positioning shaft (62) to drive the button (614) to reset, and to cause the mismatch occurring between the flat groove (613) of the positioning shaft (62) and the limit block (69), thereby realizing the eccentric mounting of the front wheel component (2), and a vehicle head part of the children's toy vehicle jouncing upwards and downwards when the children's toy vehicle moves due to the eccentric mounting of the front wheel component (2), increasing the interestingness of the children's toy vehicle.

\* \* \* \* \*